United States Patent [19]
Toyonaka et al.

[11] Patent Number: 5,283,846
[45] Date of Patent: Feb. 1, 1994

[54] OPTICAL ISOLATOR, OPTICAL CIRCUIT, AND RARE-EARTH-DOPED FIBER OPTICAL AMPLIFIER

[75] Inventors: Takashi Toyonaka, Hachiouji; Shinji Tsuji, Hidaka; Makoto Haneda, Takasaki; Yuichi Ono, Nishitama, all of Japan

[73] Assignee: Hitachi, Ltd., Tokyo, Japan

[21] Appl. No.: 898,556

[22] Filed: Jun. 15, 1992

[30] Foreign Application Priority Data

Jun. 21, 1991 [JP] Japan .................................. 3-150094

[51] Int. Cl.$^5$ .............................................. G02B 6/32
[52] U.S. Cl. ...................................... 385/27; 385/33; 385/74; 359/484; 359/485; 372/703
[58] Field of Search .................. 385/27, 28, 31, 33, 385/73, 74; 359/484, 485; 372/703

[56] References Cited

U.S. PATENT DOCUMENTS

| | | | |
|---|---|---|---|
| 4,548,478 | 10/1985 | Shirasaki | 359/484 |
| 4,705,351 | 11/1987 | Toda | 385/33 |
| 4,712,880 | 12/1987 | Shirasaki | 359/484 |
| 4,732,452 | 3/1988 | Carter | 385/33 |
| 4,770,494 | 9/1988 | Csencsits et al. | 385/142 |
| 4,893,890 | 1/1990 | Lutes | 385/27 |
| 5,140,598 | 8/1992 | Tagawa et al. | 372/6 |

FOREIGN PATENT DOCUMENTS

| | | | |
|---|---|---|---|
| 3-287113 | 12/1991 | Japan | 372/703 |
| 4-63317 | 2/1992 | Japan | 372/703 |

OTHER PUBLICATIONS

"High gain Er$^{3+}$-doped fiber amplifiers", Mitsubishi Cable Industries, Ltd., 319001822, C-273, pp. 4-315, Yoshida et al., 1990.

"Optical Fiber Amplifier", NTT Opto-Electronics Laboratories, *Optics*, pp. 276(2)-282(8), Masaharu Horiguchi, May 19, 1990.

*Primary Examiner*—Frank Gonzalez
*Attorney, Agent, or Firm*—Kenyon & Kenyon

[57] ABSTRACT

In a polarization dependency type optical isolator comprising wedgelike polarizing prisms 3 and 5 and a Faraday rotator 4, the mode field diameters of an input side fiber 1 and an output side fiber 7 are the same as that of a transmission fiber and an erbium-doped fiber to be connected to them. The shape and other features of each lens are controlled so that the spot size of a parallel ray which is converted from an incident ray by an input side lens 2 is equal to the spot size of a parallel ray which is converted by an output side lens 6 when a reference beam is irradiated from the fiber 7. In a rare-earth-doped fiber optical amplifier using an optical isolator which is configured in a manner similar to this, the connecting portion of the fiber and the optical isolator can be spliced by fusion without increasing the insertion loss of the optical isolator in the forward direction and the connection loss due to a difference in the mode field diameter is reduced. Therefore, the noise figure decreases and the gain increases.

9 Claims, 3 Drawing Sheets

OPTICAL ISOLATOR, OPTICAL CIRCUIT, AND RARE-EARTH-DOPED FIBER OPTICAL AMPLIFIER

BACKGROUND OF THE INVENTION

The present invention relates to an optical amplifier using the optical amplification of a rare earth-doped fiber, and relates to an optical isolator and an optical circuit which are used for the above optical amplifier.

The above optical isolator includes characteristics that a ray penetrates in the direction from the input side to the output side with little loss but scarcely penetrates in the direction from the output side to the input side and the basic structure thereof is well known.

A conventional optical amplifier is discussed in, for example, "1990 Spring national convention record, the institute of electronics, information and communication engineers C-273". In this reference an optical amplifier comprising an Er-doped fiber, a pumping light source, an optical circuit which can couple pumping light from the pumping light source and an optical signal from a transmission fiber, and optical isolators without polarization dependency which are connected to the input side end and the output side end of the Er-doped fiber respectively is disclosed. The used Er-doped fiber is an Alcodoped 1.55 μm dispersion sifted fiber with an Er concentration of 66 ppm and a refractive index difference $\Delta$ of 1.2%. The maximum gain at a pumping light input of 25 mW with a wavelength of 1.48 μm is 27.5 dB for forward single pumping or 33.0 dB for bidirectional pumping.

To increase the pumping efficiency of the above Er-doped fiber in the above prior art, the Er doping concentration, the core diameter for doping Er, and the refractive index of the core are controlled. However, no consideration is given to connection losses at the connecting portions with the optical isolator at the input side end and the output side end of the above Er-doped fiber.

The outline of the optical fiber amplifier is indicated in, for example, M. Horiguchi; Kogaku (Optics), Vol. 19, No. 5 (May, 1990), pp. 276-282.

SUMMARY OF THE INVENTION

It has been determined that at the connecting portions of the input side end and the output side end of the rare-earth-doped fiber with the optical isolators in the above prior art, the rare-earth-doped fiber and the above optical isolator differ from one another in mode field diameter. Therefore, a mode mismatch occurs and connection losses are generated, causing the noise figure of the optical amplifier to increase and the gain to decrease.

It has also been determined that when the fiber which is the base material of the rare earth-doped fiber is different in composition from the transmission fiber in the prior art (for example, when the fiber is an Er-doped fluoride glass fiber), a problem occurs that the above rare-earth-doped fiber and the optical isolator to be connected to it cannot be spliced by fusion.

The present invention allows a rare-earth-doped fiber and an optical isolator of an optical amplifier to be equal to each other in mode field diameter at the connecting portions thereof. Additionally, the present invention enables a decrease in the connection loss caused by a mode mismatch, a decrease in the noise figure of the optical amplifier, and an increase in the gain.

The present invention additionally allows a rare-earth-doped fiber of a rare-earth-doped fiber optical amplifier and an optical isolator which is to be connected to it to be spliced by fusion even when the fiber which is the base material of the above rare-earth-doped fiber is different in composition from a transmission fiber.

The present invention further provides an optical isolator and an optical circuit which are suitable for a rare-earth-doped fiber optical amplifier which accomplishes the above-described features of the present invention.

The rare-earth-doped fiber optical amplifier of the present invention includes a rare-earth-doped fiber, a pumping light source, an optical circuit which can couple pumping light from the pumping light source and an optical signal from a transmission fiber, and at least one optical isolator which is connected to the input side end and/or the output side end of the rare-earth-doped fiber and is structured so that an output from the optical circuit is input to the rare-earth-doped fiber directly or via the optical isolator. The connection loss is caused by the above mode mismatch because the mode field diameter of each single-mode fiber on the input side and the output side of the above optical isolator matches the mode field diameter of the rare-earth-doped fiber connected to it or of the transmission fiber.

An optical fiber generally has a structure that a core part with a high refractive index is surrounded by a cladding part with a low refractive index. The fiber mode field diameter W can be controlled by core diameter 2A as well as both core refractive index $n_1$ and the refractive index difference $\Delta$ as indicated by Equations (1) to (3).

$$W = A(0.65 + 1.691/V^{1.5} + 2.879/V^6) \quad (1)$$

$$V = 2\pi A n_1 \sqrt{2\Delta} / \lambda \quad (2)$$

$$\Delta = (n_1 - n_2)/n_1 \quad (3)$$

where V is the fiber normalized frequency and $N_2$ is the refractive index of the cladding material.

For example, W increases with either increasing 2A or decreasing $n_1$ or $\Delta$, and vice versa.

The mode field diameter of the optical fiber can be obtained experimentally, for example, by the following measurement.

A semiconductor laser is connected to one end of the optical fiber, a laser beam is irradiated from the other end, a photodetector mounted in front of the other end of the optical fiber revolves round the top of the optical fiber, and the light intensity distribution around the center of the optical fiber is measured. This light intensity distribution is called the far-field-pattern. By measuring the angle $\theta$ between the position of the rotational angle when the light intensity is $1/e^2$ times the peak value and the center when the light intensity is the peak value in this light intensity distribution, the mode field diameter, that is, the mode spot size w is calculated from an equation in which $w = \lambda/\pi \tan\theta$, where the symbol $\lambda$ indicates the wavelength of the light.

Particularly when the above optical isolator is an optical isolator without polarization dependency which comprises a polarizing prism, a Faraday rotator, an input side lens having an action for converting an incident ray from an input side single-mode fiber to a parallel ray, and an output side lens having an action for focusing and connecting the above parallel ray to an output side single mode fiber, by independently controlling the refractive index and shape of each lens so that the spot size of the parallel ray converted by the above input side lens is made equal to the spot size of the parallel ray to be converted by the above output side lens when a reference beam is irradiated from the above output side single-mode fiber, it is designed so that the insertion loss between the input and output fibers is minimized. By doing this, the connection loss of the above entire optical amplifier decreases and hence the noise figure decreases and the gain increases.

The light intensity distribution in the optical fiber is generally a Gaussian distribution. The distance w between the point where the light intensity is $1/e^2$ times the peak value at the center of the fiber and the center is called the mode field diameter or the mode spot size.

As mentioned above, the mode spot size in the optical fiber is adjusted by controlling the core diameter, the core refractive index, and the refractive index difference between the core and the cladding. However, the mode spot size in the optical isolator can be adjusted by simply controlling the focal lengths of the input side lens and the output side lens.

When assuming that the focal lengths of the input side lens and the output side lens are $f_1$ and $f_2$ and the spot sizes in the input side single-mode fiber and the output side single mode fiber are $w_1$ and $w_2$, the relationship that $f_1/w_1 = f_2/w_2$ is held, the connection loss caused by the difference between the spot sizes $w_1$ and $w_2$ in the input and output side single-mode fibers can be avoided. Therefore, when converting the spot size $w_1$ to the spot size $w_2$, it may be to set the focal lengths of the input side lens and the output side lens to $f_1$ and $f_2$ which satisfy $f_2/f_1 = w_2/w_1$.

The rare-earth-doped fiber optical amplifier of the present invention, may be implemented by making the composition and structure of each single-mode fiber on the input side and the output side of the above optical isolator in the optical amplifier for accomplishing the first object equal to those of the base material fiber of the above rare-earth-doped fiber to be connected to it (namely, the base material fiber is a fiber exactly the same as the above rare-earth-doped fiber except that no rare earth is included) or of the above transmission fiber, the fusing point of the above rare-earth-doped fiber is made equal to the fusing point of the single-mode fiber of the optical isolator to be connected to it and the two can be spliced by fusion.

A rare-earth-doped fiber is generally referred to as an optical fiber having a direct optical amplification by simulated emission by doping rare earth ions in the entire part or a part (for example, near the center of the core) of the core part.

In the present invention, a transmission fiber is connected to one of the single-mode fibers on the input and output sides of an optical isolator without polarization dependency and a rare-earth-doped fiber is connected to the other single-mode fiber, the mode field diameter of one of the above single-mode fibers is equal to that of the transmission fiber and the mode field diameter of the other single-mode fiber is equal to that of the rare-earth-doped fiber; the composition and structure of one of the above single-mode fibers are equal to those of the transmission fiber when necessary and the composition and structure of the other single-mode fiber are equal to those of the base material fiber of the rare-earth-doped fiber, so that the fusing points of the fibers before and behind each connecting portion are equal to each other; and the focal lengths of the input side lens and the output side lens are determined so that when a reference beam is irradiated from the above output side single-mode fiber, the spot size of the parallel ray converted by the input side lens is equal to the spot size of the parallel ray converted by the output side lens; and as to other configurations, the configuration of a conventional optical isolator and the configuration of a conventional fiber optical amplifier may be used.

The above description of the rare-earth-doped fiber optical amplifier of the present invention defines also the configuration of an optical isolator for accomplishing the third object. In the optical isolator of the present invention which is structured as mentioned above, the mode field diameter of the input side single-mode fiber is different from the mode field diameter of the output side single-mode fiber.

The transmission fiber generally comprises quartz glass, though there are no restrictions on it. As to the rare-earth-doped fiber, the material thereof is not limited to a special one, though quartz glass or fluoride glass (for example, the composition is $ZnF_4$-$BaF_2$-$LaF_3$-$YF_3$-$AlF_3$-$LiF$-$NaF$) is generally used. Fluoride glass has advantages such that i) it can be doped in high concentration, ii) it has flat amplification characteristics in a wider wavelength range, and iii) by doping $Nd^{3+}$ or $Pr^{3+}$ ions, an optical signal with a wavelength of 1.3 $\mu$m can be amplified.

The present invention obtains good results as indicated below.

The mode field diameters of the input side and output side single-mode fibers of the above optical isolator match the mode field diameter of the above rare-earth-doped fiber connected to it or of the above transmission fiber and the connection loss caused by the mode mismatch is reduced.

Furthermore, when the above optical isolator is an optical isolator without polarization dependency which comprises a polarizing prism, a Faraday rotator, an input side lens having an action for converting an incident ray from an input side single-mode fiber to a parallel ray and an output side lens having an action for focusing and connecting the above parallel ray to an output side single mode fiber, the parallel ray converted by the above input side lens passes through the above polarizing prism and the above Faraday rotator and then is connected to the output side single-mode fiber by the output side lens, and the refractive index and shape of each lens are independently controlled so that the spot size of the parallel ray converted by the above input side lens is equal to the spot size of the parallel ray converted by the above output side lens when a reference beam is irradiated from the above output side single-mode fiber, and hence the insertion loss between the input and output fibers is minimized. By doing this, the connection loss of the above entire optical amplifier decreases and hence the noise figure decreases and the gain increases.

The single-mode fibers on the input and output sides of the above optical isolator can be made same as the fiber which is the base material of the above rare-earthdoped fiber or the above transmission fiber. In this case, the above rare-earth-doped fiber and the optical isolator to be connected to it can be spliced by fusion.

DETAILED DESCRIPTION

Embodiment 1

Figure 1:
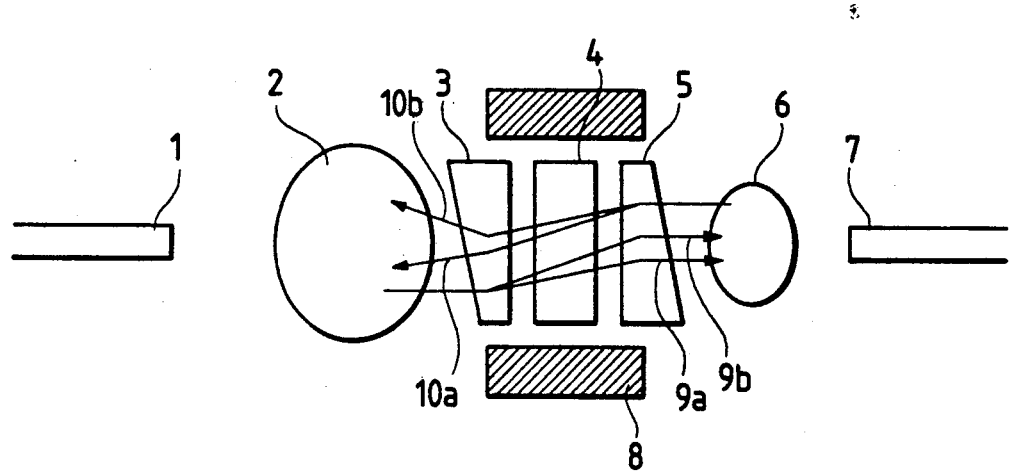
FIG. 1 is a schematic view showing the principle of an optical isolator without polarization dependency of the first embodiment of the present invention.

An optical isolator according to a first embodiment of the present invention is shown in FIG. 1. FIG. 1 is a principle diagram showing the function of the optical isolator without polarization dependency a transmission fiber is connected to the input side and an erbium-doped fiber is connected to the output side. In FIG. 1, reference numeral 1 indicates an input side single-mode fiber, 2 an input side lens, 3 an input side wedgelike polarizing prism, 4 a Faraday rotator, 5 an output side wedgelike polarizing prism, 6 an output side lens, 7 an output side single-mode fiber, 8 a cylindrical magnet, 9a and 9b an ordinary ray and an extraordinary ray in the forward direction, respectively, and 10a and 10b an ordinary ray and an extraordinary ray in the backward direction, respectively. In the forward direction, an incident ray of an optional polarization component input from the input side single-mode fiber 1 is converted to a parallel ray by the input side lens 2 and irradiated to the input side wedgelike polarizing prism 3. Since the refractive index in the input side wedgelike polarizing prism 3 is different between the ordinary ray and the extraordinary ray, the parallel ray is separated in different directions 9a and 9b. The polarization of each ray is rotated in a 45° arc by the Faraday rotator 4 and each ray is changed to a parallel ray by the output side wedgelike polarizing prism 5 whose optical axis is rotated in a 45° arc beforehand and connected to the output side single-mode fiber 7 by the output side lens 6 at a low loss. On the other hand, a ray advancing in the backward direction is irradiated from the output side single-mode fiber 7, converted to a parallel ray by the output side lens 6, and separated into the ordinary ray 10a and the extraordinary ray 10b by the output side wedgelike polarizing prism 5. The polarization of each ray is rotated in a 45° arc by the Faraday rotator 4 and each ray is irradiated to the input side wedgelike polarizing prism 3. Since the relationship between the ordinary ray and the extraordinary ray is reversed, the rays are not changed to a parallel ray and ejected at large angles. Therefore, the rays cannot be connected to the input side single-mode fiber 1 by the input side lens 2 and a high backward loss is obtained. To prevent a connection loss due to a mode mismatch at the connecting portion with the above transmission fiber at the input side end, the input side single-mode fiber 1 is the same as the above transmission fiber. In the transmission fiber and the input side single-mode fiber of this embodiment, the core diameter is 9.5 μm, the fiber diameter including the cladding is 125 μm, the refractive index of the core is 1.465, the refractive index of the cladding is 1.46, the refractive index difference is 0.35%, and the core and cladding use quartz glass.

To reduce the connection loss due to a mode mismatch at the connecting portion with the above erbium-doped fiber at the output side end, it is necessary to make the mode field diameter of the output side single mode fiber 7 equal to the mode field diameter of the above erbium-doped fiber. To increase the amplification efficiency or the amplification degree per 1 mW of pumping light power, the refractive index differences of the core and cladding of the erbium-doped fiber may be made great and the mode field diameter may be made small compared with the transmission fiber. Therefore, the core diameter is set to 5.2 μm, the refractive index difference to 1.1%, the mode field diameter to 6 μm, the erbium doping concentration to 60 ppm, and the amplification efficiency to about 0.7 dB/mW by pumping of a semiconductor laser with a wavelength of 1.48 μm. Furthermore, the mode field diameter of the output side single-mode fiber 7 is set to 6 μm and the connection loss at the connecting portion with the above erbium-doped fiber is reduced. Concretely in the present invention, the output side single-mode fiber 7 is exactly the same as the erbium-doped fiber except that no erbium is doped in the core material. In the erbium-doped fiber and the output side single-mode fiber of this embodiment, the core diameter is 5.2 μm, the fiber diameter including the cladding is 125 μm, the refractive index of the core is 1.476, the refractive index of the cladding is 1.46, and the core and cladding use quartz glass. Therefore, the comparison of the output side optical fiber with the input side optical fiber shows that the core diameter decreases and the refractive index difference increases, and hence the mode field diameter decreases.

Since the input side single-mode fiber 1 and the output side single-mode fiber 7 differ in the mode field diameter as mentioned above, the insertion loss in the forward direction increases when the input side lens 2 is the same as the output side lens 6. Therefore, the focal length of the input side lens 2 is set to 3 mm and the focal length of the output side lens 6 is set to 1.8 mm. In this case, the mode field diameter of the transmission fiber is about 10 μm and the radiation angle of the outgoing ray from the input side single-mode fiber 1 is 6.5° at the full width at half maximum, and hence the spot size of the parallel ray converted by the input side lens 2 is 0.3 mm. When a reference beam is irradiated from the output side single-mode fiber 7 with a mode field diameter of 6 μm, the radiation angle of the outgoing ray is 11° at the full width at half maximum and the spot size of the parallel ray converted by the output side lens 6 is 0.3 mm. This value is the same as that of the parallel ray from the input side lens 2 mentioned above and the insertion loss in the forward direction is reduced to 0.3 dB. When the mode field diameter of an optical fiber increases, the radiation angle of an outgoing ray generally decreases as shown in Equation (3).

Embodiment 2

Figure 2:
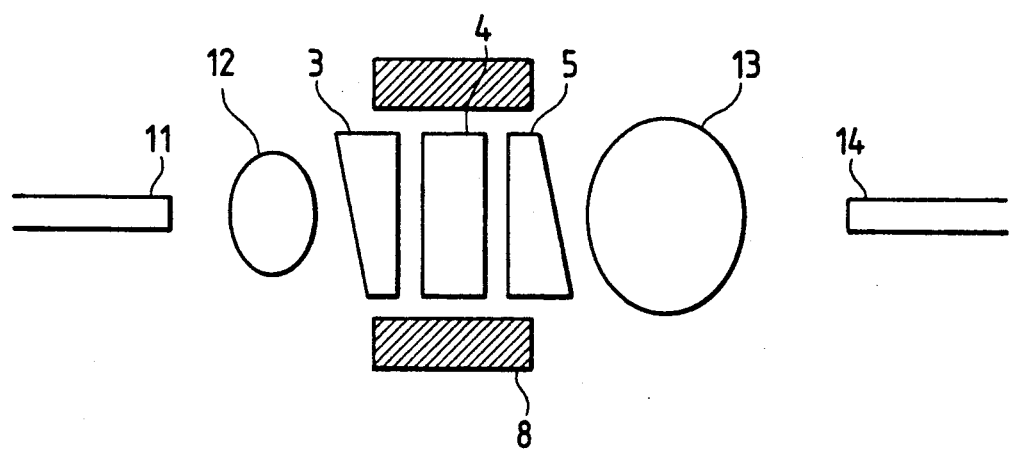
FIG. 2 is a schematic view showing the structure of an optical isolator without polarization dependency of the second embodiment of the present invention.

An optical isolator according to a second embodiment of the present invention is shown in FIG. 2. FIG. 2 is a structural diagram of the optical isolator without polarization dependency wherein the erbium-doped fiber of the first embodiment is connected to the input side and a transmission fiber is connected to the output side. In FIG. 2, an input side single mode fiber 11 and an input side lens 12 are the same as the output side single-mode fiber 7 and the output side lens 6 of the optical isolator of the first embodiment and an output side single-mode fiber 14 and an output side lens 13 are the same as the input side single-mode fiber 1 and the input side lens 2 of the optical isolator of the first embodiment. By doing this, the connection loss due to a mode mismatch at the connecting portion with the above erbium-doped fiber at the input side end and the connection loss due to a mode mismatch at the connecting portion with the above transmission fiber at the output side end decrease and the insertion loss in the forward direction is reduced to 0.3 dB simultaneously.

Embodiment 3

Figure 3:
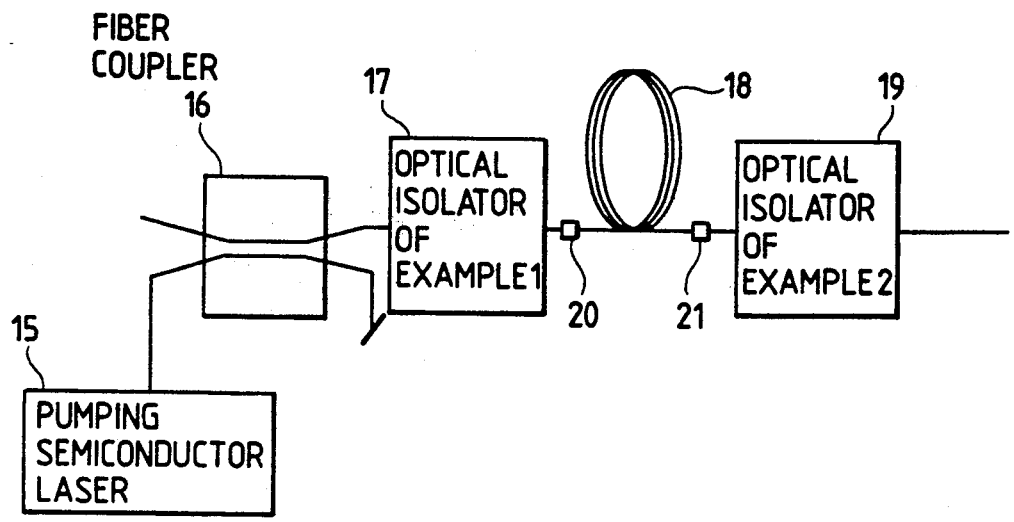
FIG. 3 is a schematic explanatory diagram showing an optical amplifier of the present invention using the optical isolator of the first and second embodiments.

FIG. 3 shows a configuration diagram of an optical amplifier using the optical isolators of the first and second embodiments as a third embodiment of the present invention. In FIG. 3, numeral 15 indicates a pumping semiconductor laser with a wavelength of 1.48 μm, 16 a fiber coupler which can couple pumping light and an optical signal with a wavelength of 1.55 μm with high efficiency, 17 the optical isolator according to the first embodiment illusrated in FIG. 1, 18 the erbium-doped fiber of the first and second embodiments, 19 the optical isolator according to the second embodiment illustrated, 20 a fusion-spliced portion of the above optical isolator 17 and the above erbium-doped fiber 18, and 21 a fusion-spliced portion of the above erbium-doped fiber 18 and the above optical isolator 19. Assuming that the mode field diameters on both sides of the fusion-spliced portions between the fibers are $W_1$ and $W_2$, the connection efficiency can be expressed as follows:

$$k = 4/(w_1/w_2 + w_2/w_1)^2$$

When optical isolators with a single-mode fiber which is the same as the transmission fiber are used on both input and output sides of the above erbium-doped fiber 18, the above mode field diameters w1 and w2 at both fusion-spliced portions are 10 μm and 6 μm and k = −1.1 dB at both portions, and hence the insertion losses of the above both optical isolators are −0.3 dB and the total connection loss generated is −2.8 dB. In this embodiment, the connection losses at the fusion-spliced portions 20 and 21 are −0.1 dB. As a result, the noise figure decreases by 1 dB, the saturated light output value increases by 1 dB, and the gain increases by 2 dB. When the pumping light intensity is set to 50 mW, the noise figure is 5.4 dB, the saturated light output value is 10 dBm, and the gain is 30 dB.

Er ions incorporated in the erbium-doped fiber 18 have intrinsic absorption bands at wavelengths of 0.51 μm, 0.66 μm, 0.81 μm, 0.98 μm, and 1.48 μm, and absorb lights with those wavelengths and enter the state that the electronic energy is excited. When a light with a wavelength of about 1.55 μm is irradiated at this time, the incident light can be amplified by simulated emission. Among the pumping lights at the wavelength bands of 0.51 to 1.48 μm, the light at the wavelength band of 1.48 μm can be obtained most easily by the semiconductor laser. Therefore, this wavelength band of 1.48 μm is promising. The appropriate band of this wavelength is 1.465 to 1.485 μm. By using the pumping light within this band, a sufficient gain is obtained for optical amplification.

Embodiment 4

Figure 4:
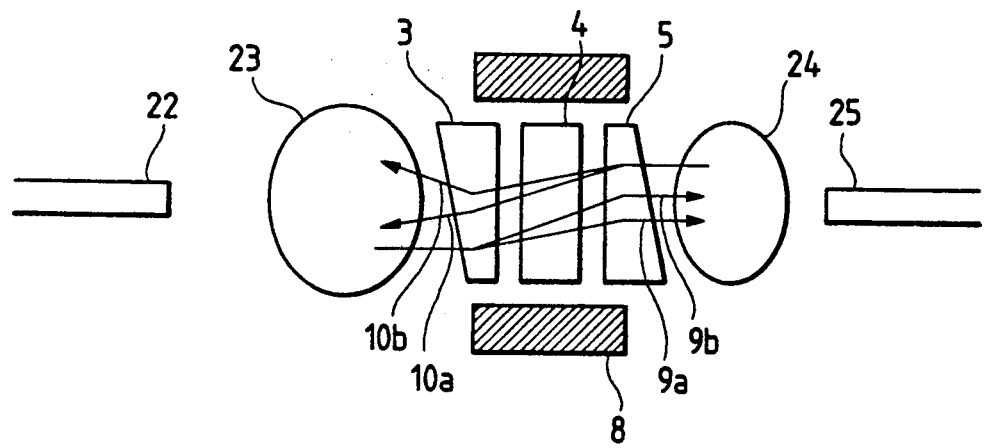
FIG. 4 is a schematic view showing the structure of an optical isolator without polarization dependency of the fourth embodiment of the present invention.

An optical isolator according to a fourth embodiment of the present invention is shown in FIG. 4. FIG. 4 is a structural diagram of the optical isolator without polarization dependency wherein a transmission fiber is connected to the input side and an erbium-doped fluoride glass fiber is connected to the output side. In FIG. 4, numeral 22 indicates an input side single-mode fiber, 23 an input side lens, 24 an output side lens, and 25 an output side single mode fiber. The input side single-mode fiber 22 is the same as the above transmission fiber and as that of the first embodiment. To allow the output side single-mode fiber 25 to be spliced by fusion with the above erbium-doped fluoride glass fiber at the connecting portion with the fluoride glass fiber at the output side end and to reduce the connection loss due to a mode mismatch, the output side single-mode fiber 25 is made the same as the fluoride glass fiber which is the base material of the above erbium-doped fluoride glass fiber (that is, the same as the erbium-doped fluoride glass fiber except that no erbium is incorporated in the core). In the erbium-doped fluoride glass fiber, the core diameter is 7 μm, the fiber diameter including the cladding is 125 μm, the refractive index difference is 0.4%, the mode field diameter is 8 μm, the erbium doping concentration is 2000 ppm, and the fiber length is 50 cm. A gain of about 18 dB is obtained at wavelengths from 1.54 to 1.565 μm by pumping a semiconductor laser with a wavelength of 1.48 μm. Since the mode field diameter of the input side single-mode fiber 22 is different from that of the output side single mode fiber 25, the insertion loss in the forward direction increases when the input side lens 23 is the same as the output side lens 24. Therefore, the focal length of the input side lens 23 is set to 3 mm and the focal length of the output side lens 24 is set to 2.2 mm. In this case, the mode field diameter of the transmission fiber is about 10 μm and the radiation angle of the outgoing ray from the input side single-mode fiber 22 is 6.5° at the full width at half maximum, and hence the spot size of the parallel ray converted by the input side lens 23 is 0.3 mm. When a reference beam is irradiated from the output side single mode fiber 25 with a mode field diameter of 8 μm, the radiation angle of the outgoing ray is 8.2° at the full width at half maximum and the spot size of the parallel ray converted by the output side lens 24 is 0.3 mm. This value is the same as that of the parallel ray from the input side lens 23 mentioned above and the insertion loss in the forward direction is reduced to 0.3 dB.

Embodiment 5

Figure 5:
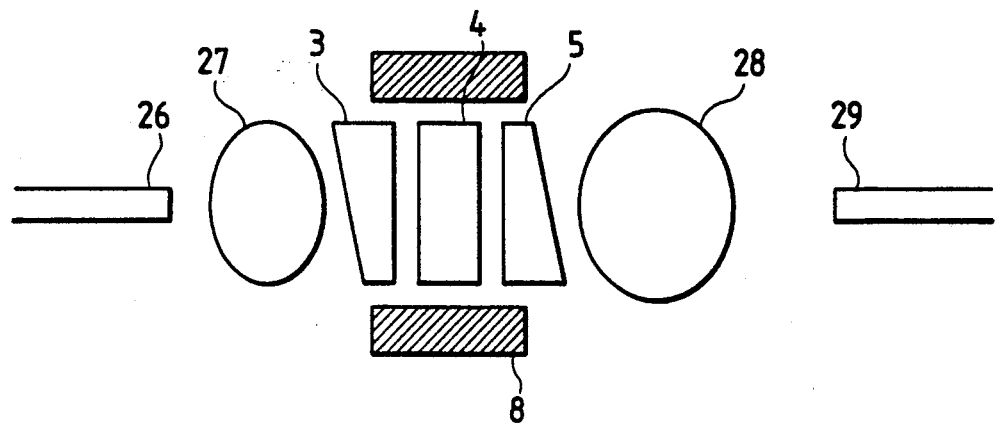
FIG. 5 is a schematic view showing the structure of an optical isolator without polarization dependency of the fifth embodiment of the present invention.

An optical isolator according to a fifth embodiment of the present invention is shown in FIG. 5. FIG. 5 is a structural diagram of the optical isolator without polarization dependency wherein the erbium-doped fluoride glass fiber of the fourth embodiment is connected to the input side and a transmission fiber is connected to the output side. In FIG. 5, an input side single-mode fiber 26 and an input side lens 27 are the same as the output side single-mode fiber 25 and the output side lens 24 of the optical isolator of the fourth embodiment and an output side single-mode fiber 29 and an output side lens 28 are the same as the input side single-mode fiber 22 and the input side lens 23 of the optical isolator of the fourth embodiment. By doing this, the connecting portion with the above erbium-doped fluoride glass fiber at the input side end can be spliced by fusion, the connection loss due to a mode mismatch decreases, and the insertion loss in the forward direction is reduced to 0.3 dB simultaneously.

Embodiment 6

Figure 6:
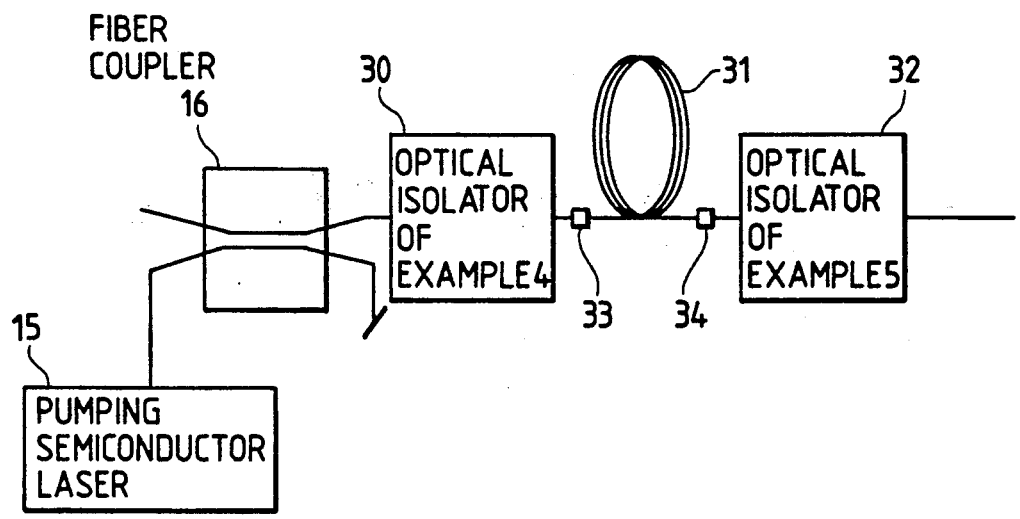
FIG. 6 is a schematic explanatory diagram showing an optical amplifier of the present invention using the optical isolator of the fourth and fifth embodiments.

FIG. 6 shows a configuration diagram of an optical amplifier using the optical isolators of the fourth and fifth embodiments as a sixth embodiment of the present invention. In FIG. 6, numeral 30 indicates the optical isolator of the fourth embodiment, 31 the erbium-doped fluoride glass fiber of the fourth and fifth embodiments, 32 the optical isolator of the fifth embodiment, 33 a connecting portion of the above optical isolator 30 and the above erbium-doped fluoride glass fiber 31, and 34 a connecting portion of the above erbium-doped fluoride glass fiber 31 and the above optical isolator 32. Numerals 15 and 16 are the same as those of the third embodiment. When optical isolators with a single-mode fiber which is the same as the transmission fiber are used on both input and output sides of the above erbium-doped fluoride glass fiber 31, both connecting portions cannot be spliced by fusion, and hence it is difficult to keep stable connection for a long period of time. In this embodiment, the connection losses at the connecting portions 33 and 34 are reduced to −0.2 dB by fusion-splicing. As a result, when the pumping light intensity is set to 60 mW, the saturated light output value is 5 dBm and the gain is 17 dB.

As described in the above embodiments, by making the composition and structure of each of an input side single-mode fiber and an output side single-mode fiber of an optical isolator the same as those of the base fiber of a rare-earth-doped fiber which is used as an optical fiber to be connected or the same as those of a transmission fiber which is used as an optical fiber to be connected, the mode field diameters and fusing points of the optical fibers on both sides of the connecting portion are the same respectively, the connection loss due to a mode mismatch reduces extremely, and the connecting portion can be spliced by fusion.

According to the present invention as mentioned above, in an optical amplifier using the optical amplification of a rare-earth-doped fiber, the connection loss at the connecting portion of the rare-earth-doped fiber and an optical isolator can be reduced, and hence optical amplification with a low noise, high saturated light output, and high gain is possible. Therefore, the optical amplifier can be used widely in the systems such as in line- and pre-amplifiers.

What is claimed is:

1. An optical amplifier comprising a rare-earth-doped fiber, a pumping light source, an optical circuit which can couple pumping light from said pumping light source and an optical signal from a transmission fiber, and at least one optical isolator connected to said rare-earth-doped fiber, wherein the transmission fiber is connected to one of an input side single-mode fiber and an output side single-mode fiber of said optical isolator, said rare-earth-doped fiber is connected to the other single-mode fiber of said optical isolator, the mode field diameter of said one single-mode fiber is equal to the mode field diameter of said transmission fiber, and the mode field diameter of said other single-mode fiber is equal to the mode field diameter of the base material fiber of said rare earth-doped fiber.

2. An optical amplifier according to claim 1, wherein the single-mode fiber whereto the transmission fiber is connected is the same as said transmission fiber and the single-mode fiber whereto the rare-earth-doped fiber is connected is the same as the base material fiber of said rare-earth-doped fiber.

3. An optical amplifier according to claim 2, wherein both said transmission fiber and the base material fiber of said rare-earth-doped fiber are quartz glass fibers.

4. An optical amplifier according to claim 2, wherein said transmission fiber is a quartz glass fiber and the base material fiber of said rare-earth-doped fiber is a fluoride glass fiber.

5. An optical amplifier according to claim 1, wherein said optical isolator has no polarization dependency.

6. An optical amplifier according to claim 5, wherein said optical isolator has a polarizing prism, a Faraday rotator, an input side lens for converting an incident ray from said input side single-mode fiber to a parallel ray, and an output side lens for focusing and connecting said parallel ray to said output side single-mode fiber and the focal lengths of said input side lens and said output side lens are independently predetermined so that the spot size of the parallel ray from the input side lens is made equal to the spot size of the parallel ray which is converted from the reference beam irradiated to the output side single-mode fiber by the output side lens in said optical isolator.

7. An optical isolator having single-mode fibers on the input and output sides respectively, wherein both single mode fibers are different from each other in mode field diameter and the mode field diameter of each single-mode fiber is equal to the mode field diameter of an optical fiber to be connected to each single-mode fiber, wherein an optical fiber to be connected to one of said single-mode fibers on the input and output sides is a transmission fiber and an optical fiber to be connected to the other single-mode fiber is a rear-earth-doped fiber, wherein one of said single-mode fibers on the input and output sides is the same as said transmission fiber and the other single-mode fiber is the same as the base material fiber of said rare-earth-doped fiber, and wherein said transmission fiber is a quartz glass fiber and the base material fiber of said rare-earth-doped fiber is a fluoride glass fiber.

8. In an optical amplifier having a rare-earth-doped fiber, a pumping light source, an optical circuit which can couple pumping light from said pumping light source and an optical signal from a transmission fiber, wherein said optical amplifier includes:
   a first optical isolator comprising a first single-mode fiber connected to said rare-earth-doped fiber at one of an input side and an output side and a second single-mode fiber connected to said transmission fiber at the other of the input side and output side, and
   a second optical isolator in which the mode field diameter of said single-mode fiber connected to said rare-earth-doped fiber is equal to the mode field diameter of said rare-earth-doped fiber, and the mode field diameter of said single-mode fiber connected to said transmission fiber is equal to the mode field diameter of said transmission fiber.

9. An optical isolator according to claim 8, wherein the single-mode fiber to which the transmission fiber is connected is the same as said transmission fiber and the single-mode fiber to which the rare-earth-doped fiber is connected is the same as the base material fiber of said rare-earth-doped fiber.

* * * * *

UNITED STATES PATENT AND TRADEMARK OFFICE
CERTIFICATE OF CORRECTION

PATENT NO.   : 5,283,846
DATED        : February 1, 1994
INVENTOR(S)  : Masanobu Onikata, et. al.

It is certified that error appears in the above-indentified patent and that said Letters Patent is hereby corrected as shown below:

Column 5, line 30, change "dependency a" to --dependency. A--

Column 7, line 35, after "trated" insert --in FIG. 2--

Signed and Sealed this

Ninth Day of August, 1994

Attest:

BRUCE LEHMAN

Attesting Officer    Commissioner of Patents and Trademarks